United States Patent [19]

Bauer et al.

[11] Patent Number: 5,238,997
[45] Date of Patent: Aug. 24, 1993

[54] POLYOLEFIN/NYLON REINFORCED RUBBER

[75] Inventors: Richard G. Bauer, Kent, Ohio; Joseph W. Miller, Jr., Seabrook, Tex.

[73] Assignee: The Goodyear Tire & Rubber Company, Akron, Ohio

[21] Appl. No.: 772,299

[22] Filed: Oct. 7, 1991

[51] Int. Cl.$^5$ .............................................. C08L 77/00
[52] U.S. Cl. ...................................... 525/66; 525/179
[58] Field of Search .................................. 525/66, 179

[56] References Cited

U.S. PATENT DOCUMENTS

| | | | |
|---|---|---|---|
| 3,483,276 | 12/1969 | Mahlman | 260/897 |
| 4,338,413 | 7/1982 | Coran et al. | 525/179 |
| 4,520,171 | 5/1985 | Diveley et al. | 525/279 |
| 4,814,379 | 3/1989 | Flood et al. | 525/66 |
| 4,833,186 | 5/1989 | Bertelli et al. | 524/100 |
| 4,912,150 | 3/1990 | Ushiroji et al. | 524/504 |
| 4,937,290 | 6/1990 | Bauer et al. | 525/184 |
| 4,988,764 | 1/1991 | Nishio et al. | 525/66 |
| 5,023,301 | 5/1991 | Burlett et al. | 525/232 |

OTHER PUBLICATIONS

Felix et al., Polymeric Materials Science & Engineering, vol. 64, pp. 123–124.

Datta et al., Polymeric Materials Science & Engineering, vol. 64, pp. 121–122.

Primary Examiner—Ana L. Carrillo
Attorney, Agent, or Firm—Bruce J. Hendricks

[57] ABSTRACT

The present invention relates to a modified rubber composition comprising:

(a) an uncured diene rubber selected from the group consisting of polybutadiene, styrene-butadiene rubber, isoprene-butadiene rubber, isoprene-butadiene-styrene rubber, nitrile rubber and carboxylated nitrile rubber;

(b) from about 1 to 100 phr of a polymeric blend containing
  (i) from about 10 to 35 weight percent of at least one nylon,
  (ii) from about 65 to 90 weight percent of at least one polyolefin selected from the group consisting of polypropylene, polypropylene modified with ethylene, and ethylene/propylene copolymers, and
  (iii) from about 1 to about 10 weight percent of an anhydride modified polyolefin containing from 0.2 to 9% by weight of chemically combined anhydride; and (c) at least one dithio diacid having the formula HOOC—A—S—S—A—COOH wherein A represents an alkylene group containing from about 1 to 10 carbon atoms.

7 Claims, No Drawings

POLYOLEFIN/NYLON REINFORCED RUBBER

BACKGROUND OF THE INVENTION

It is sometimes desirable to increase the modulus of rubber compounds. For instance, it is generally desirable to increase the modulus of rubber compounds which are utilized in tire tread base compositions and in tire wire coat compounds. A high degree of stiffness in such rubber compositions is conventionally attained by incorporating larger amounts of fillers, such as carbon black, into the rubber compounds and/or by increasing the state of cure of such compounds. Unfortunately, both of these techniques lead to undesirable results. For instance, the incorporation of additional carbon black into rubber compounds typically leads to high levels of hystersis. Accordingly, the utilization of such compounds in tires results in excessive heat buildup and poor cut growth characteristics. The utilization of high amounts of sulfur to attain a high state of cure typically leads to poor aging resistance. Furthermore, it is highly impractical to reach high levels of stiffness by increased state of cure alone. For these reasons, it is not possible to attain the desired degree of stiffness in rubber compounds by simply adding higher levels of fillers or curatives.

SUMMARY OF THE INVENTION

The present invention relates to a modified rubber composition which may be used as an additive to a diene rubber to provide polyolefin/nylon fibrils which will be randomly dispersed through a vulcanized diene containing rubber matrix. Addition of the modified rubber to a diene rubber increases the modulus without detrimental effort on age resistance and hysteresis.

DETAILED DESCRIPTION OF THE INVENTION

There is disclosed a modified rubber composition comprising
(a) an uncured diene rubber selected from the group consisting of polybutadiene, styrene-butadiene rubber, isoprene-butadiene rubber, isoprene-butadiene-styrene rubber, nitrile rubber and carboxylated nitrile rubber:
(b) from about 1 to 100 phr of a polymeric blend containing
  (i) from about 10 to 35 weight percent of at least one nylon,
  (ii) from about 65 to 90 weight percent of at least one polyolefin selected from the group consisting of polypropylene, polypropylene modified with ethylene, and ethylene/propylene copolymers, and
  (iii) from about 1 to about 10 weight percent of an anhydride modified polyolefin containing from 0.2 to 9% by weight of chemically combined anhydride; and
(c) at least one dithio diacid having the structural formula HOOC—A—S—S—A—COOH wherein A represents an alkylene group containing from about 1 to 10 carbon atoms.

For the purposes of the present invention, the phrase "modified rubber composition" is a mixture of an uncured diene rubber and from about 1 to 100 phr of a polymeric blend. Preferably, the polymeric blend is present in the modified rubber composition in an amount ranging from about 20 to about 50 phr. The uncured diene rubber including unvulcanized diene rubber typically contains repeat units which are derived from diene monomers, such as conjugated diene monomers and/or nonconjugated diene monomers. Such conjugated and nonconjugated diene monomers typically contain from 4 to about 8 carbon atoms. Some representative samples of suitable diene monomers contain 1,3-butadiene, isoprene, 2,3-dimethyl-1,3-butadiene, 2-methyl-1,3-pentadiene, 3,4-dimethyl-1,3-hexadiene, 4,5-diethyl-1,3-octadiene, phenyl-1,3-butadiene and the like. The diene rubber can also contain various vinyl aromatic monomers, such as styrene, 1-vinyl napthalene, 2-vinyl napthalene, methylstyrene, 4-phenyl styrene, 3-methyl styrene, and the like. Some representative examples of diene rubbers that can be used to prepare the modified rubber include polybutadiene, styrene-butadiene rubber (SBR), synthetic polyisoprene, natural rubber, isoprene-butadiene rubber, isoprene-butadiene-styrene rubber, nitrile rubber, carboxylated nitrile rubber and EPDM rubber. Preferably, the unvulcanized diene rubber is synthetic polyisoprene.

The modified rubber composition has a particular utility as an additive to rubber stocks (host stock) to provide fibrils of polypropylene and/or nylon and improve the modulus values for the host stock. Therefore, it is critical that the modified rubber composition contain only uncured or unvulcanized diene rubber to avoid the problem of uniformly dispersing a vulcanized rubber in an unvulcanized host rubber stock and then attempting to vulcanize the host rubber.

The modified rubber of the present invention contains 1 to 100 phr (parts per hundred parts of rubber) of a polymeric blend. For the purposes of the present invention, the phrase "polymeric blend" is a mixture of (1) from about 10 to 35 weight percent of at least one nylon, (2) from about 65 to 90 weight percent of at least one polyolefin selected from the group consisting of polypropylene, polypropylene modified with ethylene, ethylene/propylene copolymers and mixtures of propylene with up to 20 weight percent by weight of ethylene/propylene elastomeric copolymers containing up to 50% by weight of copolymerized ethylene, and (3) from about one to about 10 weight percent of an anhydride modified polyolefin containing 0.2 to 9% by weight of combined anhydride. Preferably, the polymeric blend comprises from about 12 to about 30 weight percent of the nylon component, from about 70 to about 88 weight percent of at least one polyolefin and from about 2 to about 8 weight percent of the anhydride modified polyolefin.

Virtually any type of nylon can be utilized in preparing the polymeric blend. These nylons are polyamides which can be prepared by reacting diamines with dicarboxylic acid. The diamines and dicarboxylic acid which are utilized in preparing such nylons will generally contain from about 2 to about 12 carbon atoms. Nylons can also be prepared by addition polymerization. Nylon which is prepared by reacting hexamethylene diamine with adipic acid (hexanedioic acid) can be utilized to form the polymeric blend. It is generally referred to as nylon-6,6 because it is derived from a diamine which contains six carbon atoms and a dicarboxylic acid which contains six carbon atoms. Nylon-6,6 typically has a number average molecular weight of 12,000 to 20,000, is exceptionally strong, abrasion resistant and is available from a wide variety of sources.

The nylons which are preferred for utilization in the modified rubber compositions of the present invention have melting points which are within a range of from about 150° C. to 255° C. Some representative examples of such preferred nylons include nylon-6,6, nylon-6, nylon-7, nylon-8, nylon-9, nylon-10, nylon-11, nylon-12 and nylon-6,12. The most preferred nylons have melting points which are within the range of from about 175° C. to about 210° C. Some representative examples of such highly preferred nylons include nylon-8, nylon-9, nylon-10, nylon-11 and nylon-12.

Polycapryllactam, which is generally referred to as nylon-8, is generally prepared by polymerizing capryllactam. This polymerization takes place readily in the melt with a small amount of amino acid initiator. Capryllactam is prepared by dimerization of butadiene to cyclooctadiene, which is hydrogenated to cyclooctane, oxidized to cyclooctanone, converted to the oxime with hydroxyl amine, and subjected to the Beckmann rearrangement. Nylon-8 has a melting point of 200° C.

Nylon-12 or poly(omega-dodecanolactam) is normally prepared by the polymerization of omega-dodecanolactam at a high temperature of at least about 300° C. utilizing an acid catalyst. Omega-dodecanolactam is prepared by trimerization of butadiene to cyclododecatriene, the subsequent hydrogenation to cyclodedocane, followed by oxidation to cyclododecanone, which is converted to the oxime with hydroxylamine, with the oxime being rearranged by Beckmann arrangement to yield the omega-dodecanolactam. Nylon-12 has a melting point of 179° C.

The nylons used in the present invention would typically have a number average molecular weight which is within the range of from about 8,000 to about 40,000. Such nylons will more typically have number average molecular weights which are within the range of from about 10,000 to about 25,000. The nylon utilized can be capped or can have free primary amine end groups. However, nylons having free amine end groups are believed to react more quickly with thio acids and are accordingly preferred.

The polymeric blend contains at least one polyolefin. Examples of polyolefins include polypropylene, polypropylene modified with ethylene, and ethylene/propylene copolymers.

The maleic anhydride-modified polyolefins which are used to form the polymeric blend are known materials containing about 0.2 to 9% by weight of chemically combined maleic anhydride, preferably about 2 to 5%. A commercially available anhydride modified polyolefin is either amorphous or crystalline polypropylene and is sold under the trademark Hercoprime ® by Hercules Incorporated, Wilmington, Del. Polyethylene modified with maleic anhydride is available commercially from Chemplex Company of Rolling Meadows, Ill., under the trademark Plexar ®. Any polymer or copolymer of ethylene, propylene, or butene-1 can be modified via the maleic anhydride moiety to form the substrate molecule, including polyethylene, polypropylene, ethylene-propylene copolymer, propylene-butene-1 copolymer, or butene-1-ethylene copolymer. The most frequently encountered and the most preferred maleic anhydride modified polyolefin is that based on crystalline or stereoregular polypropylene.

Preparation of maleic modified polypropylene is described in U.S. Pat. No. 3,483,276. The preparation of the maleic modified polypropylene consists of treating the olefin polymer with the material or by means which will induce the formation of active-free radical sites thereof with which maleic anhydride can react. Active centers can be induced, e.g. by subjecting the polymer to the action of high energy ionizing radiation such as gamma rays, X-rays, or high speed electrons; by contacting it, either as a solid or as a solution in a solvent, with a free radical producing material such as dibenzoyl peroxide, dilauryl peroxide, dicumyl peroxide or t-butyl perbenzoate; or by simply milling it in the presence of air.

There are currently available commercial products which contain nylon 6, polypropylene and an anhydride modified polyolefin (polypropylene). These products are marketed by Himont Advanced Materials of Lansing, Michigan under the designations ETN-4120 and ETN-3121. ETN-3121 is approximately 72% by weight of polypropylene, 28% by weight of nylon 6 and 2.5% by weight of maleic anhydride modified polypropylene. ETN-4120 is approximately 86% by weight of polypropylene, 14% by weight of nylon 6 and 2.5% by weight of maleic anhydride modified polypropylene.

The dithio diacids are used to "compatibilize" the polymeric blend containing the nylon and polyolefin with the uncured diene rubber. The dithio diacids which are utilized are compounds which contain at least two carboxyl groups and two mercapto groups. Such dithio diacids have the general formula HOOC—A—S—S—A—COOH wherein A represents an alkylene group containing from 1 to 10 carbon atoms. Some representative examples of such dithio diacids include dithio diacetic acid, dithio dipropanoic acid, dithio dibutanoic acid, dithio dipentanoic acid, and dithio dihexanoic acid. Dithio dipropanoic acid is the most highly preferred of the dithio diacids.

The modified rubber composition of the present invention has particular application as an additive to be subsequently blended with a diene rubber. The diene rubber may be the same or different than that which is a component of the modified rubber composition. The modified rubber composition containing the uncured diene rubber, nylon, polyolefin, anhydride modified polyolefin and dithio diacid is added to an unvulcanized rubber stock in an amount sufficient so that the total amount of polyolefin and nylon in the rubber stock ranges from about 5 phr to about 25 phr. The phr of the polyolefin and nylon is based on the total amount of rubber in the rubber stock including the modified rubber composition and the unmodified unvulcanized rubber stock to which the modified rubber composition is added. Preferably, the total amount of polypropylene and nylon in the blend ranges from about 10 to about 20 phr. The modified rubber may be present in an amount of ranging from about 10 weight percent to about 75 weight percent of the total weight of the combined modified rubber composition and diene rubber. Preferably, the modified rubber will range from 40 to 70 weight percent. The rubber stock is predominately a diene rubber. Suitable examples of such rubbers or blends thereof are listed for use in the modified rubber composition. In a particularly preferred mode, the same diene rubber is used in the modified rubber composition that is used in the rubber stock in order to provide inherent compatibility of the diene rubbers in the blend.

In addition to the diene rubber, the rubber stock may contain conventional additives including fillers, pigments, zinc oxide, stearic acid, accelerators, sulfur vulcanizing agents, stabilizers, antidegradants, processing oils, trackifiers, plasticizers, waxes, prevulcanization inhibitors, extender oils, and the like. Representative of suitable fillers include carbon black, silica, titanium dioxide and clay which are typically added in amounts ranging from about 25 to about 125 phr depending on the application of the stock. Representative of conventional accelerators are amines, guanidines, thioureas, thiazoles, thiurams, sulfenamides, dithiocarbamates and xanthates which are typically added in amounts from about 0.2 to 5 phr. Representative of sulfur vulcanizing agents include elemental sulfur (free sulfur), or sulfur donating vulcanizing agents, for example, an amine disulfide, polymeric polysulfide or sulfur olefin adducts. The amount of the sulfur vulcanizing agent will vary depending upon the type of rubber and particular type of sulfur vulcanizing agent but generally from about 0.1 phr to about 5 phr with a range of from about 0.5 to about 2 being preferred. Representative of the antidegradants which may be used in the rubber stock include monophenols, bisphenols, thiobisphenols, polyphenols, hydroquinone derivatives, phosphites, phosphate blends, thioesters, naphthylamines, diphenylamines as well as other diarylamines derivatives, para-phenylene diamines, quinolines and blended amines. Antidegradants are generally used in an amount ranging from about 0.10 phr to about 10 phr. Representative of processing oils which may be used in the rubber stock include activated dithio-bisbenzaldehyde, poly-para-dinitrobenzene, xylyl mercaptans, aliphatic-nathenic aromatic resins, polyethylene glycol, petroleum oils, ester plasticizer, vulcanized vegetable oils, pine tar, phenolic resins, petroleum resins, polymeric esters and rosins. These processing oils may be used in conventional amounts ranging from about 0 to about 30 phr. Certain waxy materials, added in excess of their solubility in rubbers are commonly used in amounts ranging from about 0.5 phr to 2.0 phr. Representative of waxes which may be used include paraffin, microcrystalline waxes and various mixtures thereof.

A rubber stock containing the modified rubber composition may be used to form a number of composites including tires, belts or hoses. Preferably, the composite is a tire.

The following examples are used to illustrate and not limit the present invention. All parts are by weight unless specifically stated otherwise.

EXAMPLE 1

Preparation of Modified Rubber Composition

Three samples of modified rubbers were prepared in accordance with the following procedure. One hundred parts of polyisoprene was placed in a 250 milliliter electronically heated Brabender mixer. The polyisoprene rubber was commercially available from The Goodyear Tire & Rubber Company under the designation Natsyn® 2200. While mixing at 70 rpm, the respective amount of a polymeric blend containing nylon, polyolefin, and an anhydride modified polyolefin was added. The polymeric blend that was used was either Himont's ETN-4120 or ETN-3121. Table I below lists respective amounts of the polymeric blend. In addition, 0.5 parts of 4-hydroxy methyl 2,6-ditertiarybutylphenol and 0.5 parts of diarylphenylenediamine were also added. Table I below also provides the amount of dithiodipropionic acid that was added to each sample. Each of the materials was allowed to mix for five minutes at 190° C. Each stock was then dumped and collected.

TABLE I

|  | Sample 1 | Sample 2 | Sample 3 |
|---|---|---|---|
| Polyisoprene | 100 | 100 | 100 |
| ETN 4120 | 43 | — | — |
| ETN 3131 | — | 25 | 25 |
| DTDPA[1] | 1.2 | .8 | .8 |

[1]Dithiodipropionic acid

EXAMPLE 2

Three rubber stocks were prepared containing one of the three samples of the modified rubbers of Example I. The rubber stock was prepared in a Brabender mixer using two separate stages of addition. The Brabender mixer was operated at 50 rpm. The components of the first stage were the polyisoprene, the sample of modified rubber composition of Example 1 and conventional amounts of carbon black, antiozonant, plasticizer, processing oil, stearic acid, and wax. The components of the second state consisted of the mixed components of stage 1 plus conventional amounts of antioxidant, zinc oxide, accelerators and sulfur. For the purpose of comparison, a cured specimen was prepared which differed from Specimens 1–3 by not containing any modified rubber from Example 1. Table II below provides the parts by weight of polyisoprene and sample from Example 1 which were used in each specimen. Each rubber stock was cured at 150° C. The cured specimens of each rubber stock were prepared by placing 6.2 grams of the compounded stock in a 1¼" (3.175 mm)×3¼" (8.255 mm)×1/16" (0.159 mm) cure mold cavity and press curing the sample at 150° C. under 280 psi pressure. Each rubber stock was cured to T90. Table II provides the physical properties of each rubber stock.

TABLE II

|  | Specimen 1 | Specimen 2 | Specimen 3 | Control |
|---|---|---|---|---|
| Ingredients |  |  |  |  |
| Polyisoprene | 65 | 40 | 40 | 100 |
| Sample 1 of Ex 1 | 50 |  |  |  |
| Sample 2 of Ex 1 |  | 75 |  |  |
| Sample 3 of Ex 1 |  |  | 75 |  |
| Rheometer 150° C. |  |  |  |  |
| Max (dN-m) | 40.0 | 39.8 | 43.0 | 38.8 |
| Min (dN-m) | 9.5 | 9.3 | 9.4 | 7.2 |
| DRh (dN-m) | 30.5 | 30.5 | 33.6 | 31.6 |
| t2 (min.) | 3.7 | 4.0 | 3.9 | 3.6 |
| t25 (min.) | 4.8 | 5.1 | 5.1 | 4.6 |
| t90 (min.) | 8.7 | 9.1 | 9.6 | 7.5 |
| Instron |  |  |  |  |
| Modulus 50% | 3.0 | 2.2 | 2.5 | 1.4 |
| (MPa) 300% | 13.0 | 11.5 | 14.3 | 11.1 |
| ultimate | 22.9 | 26.6 | 29.6 | 30.3 |
| Elong @ Break (%) | 455 | 540 | 520 | 555 |
| Rheovibron |  |  |  |  |
| Tan delta, 0° C. | .070 | .069 | .067 | 0.055 |
| Tan delta 60° C. | .070 | .070 | .069 | .50 |

It can be seen in the data provided in Table II that the compounds containing the modified rubbers have higher low strain tensile moduli than the control with little loss in ultimate tensile properties and dynamic viscoelastic properties very comparable to the control.

What is claimed is:

1. A modified rubber composition comprising
   (a) an uncured diene rubber selected from the group consisting of polybutadiene, styrene-butadiene rubber, synthetic polyisoprene rubber, natural rubber, isoprene-butadiene rubber, isoprene-butadiene-styrene rubber, nitrile rubber, and carboxylated nitrile rubber;

(b) from about 1 to 100 phr of a polymeric blend containing
   (i) from about 10 to 35 weight percent of at least one nylon,
   (ii) from about 65 to 90 weight percent of at least one polyolefin selected from the group consisting of polypropylene, polypropylene modified with ethylene, and ethylene/propylene copolymers, and
   (iii) from about 1 to about 10 weight percent of an anhydride modified polyolefin containing from 0.2 to 9% by weight of chemically combined anhydride; and (c) at least one dithio diacid having the structure formula HOOC—A—S—S—A—COOH wherein A represents an alkylene group containing from about 1 to 10 carbon atoms.

2. The modified rubber composition of claim 1 wherein said dithio diacid is dithiodipropionic acid.

3. The modified rubber composition of claim 1 comprising (a) uncured diene rubber and (b) from about 20 to about 50 phr of said polymeric blend.

4. The modified rubber composition of claim 1 wherein said modified rubber composition is added to a diene rubber wherein said modified rubber composition is present in amounts ranging from about 10 to about 75 weight percent of the total weight of the combined modified rubber composition and said diene rubber.

5. The modified rubber composition of claim 1 wherein said modified rubber composition is added to a diene rubber composition in amounts sufficient so that the total amount of nylon and polyolefin in the combined weight of the modified rubber composition and diene rubber amounts from about 2 to about 25 phr.

6. The modified rubber composition of claim 1 wherein said diene rubber is synthetic polyisoprene.

7. The modified rubber composition of claim 5 wherein said polyolefin is polypropylene.

* * * * *